United States Patent
Chokai et al.

(10) Patent No.: US 7,652,124 B2
(45) Date of Patent: Jan. 26, 2010

(54) RIGID HETEROCYCLIC POLYMER, PRODUCTION PROCESS THEREOF, AND FIBERS COMPRISING THE POLYMER

(75) Inventors: Masayuki Chokai, Iwakuni (JP); Anton Peter De Weijer, Iwakuni (JP); Hiroaki Kuwahara, Iwakuni (JP); Shunichi Matsumura, Iwakuni (JP)

(73) Assignees: Teijin Limited, Osaka (JP); Teijin Techno Products Limited, Osaka (JP)

( * ) Notice: Subject to any disclaimer, the term of this patent is extended or adjusted under 35 U.S.C. 154(b) by 102 days.

(21) Appl. No.: 11/578,413

(22) PCT Filed: Apr. 12, 2005

(86) PCT No.: PCT/JP2005/007361

§ 371 (c)(1),
(2), (4) Date: Dec. 20, 2007

(87) PCT Pub. No.: WO2005/100442

PCT Pub. Date: Oct. 27, 2005

(65) Prior Publication Data

US 2008/0214772 A1 Sep. 4, 2008

(30) Foreign Application Priority Data

| Apr. 14, 2004 | (JP) | ............................ 2004-118799 |
| Oct. 25, 2004 | (JP) | ............................ 2004-309696 |
| Feb. 7, 2005 | (JP) | ............................ 2005-030239 |

(51) Int. Cl.
*C08G 65/38* (2006.01)
*C08G 63/00* (2006.01)

(52) U.S. Cl. ............... 528/210; 424/401; 527/100; 528/183; 528/186

(58) Field of Classification Search ............... 424/401; 527/100; 528/210, 183, 186
See application file for complete search history.

(56) References Cited

U.S. PATENT DOCUMENTS

| 4,051,108 A | 9/1977 | Helminiak et al. |
| 4,225,700 A | 9/1980 | Wolfe et al. |
| 4,931,532 A | 6/1990 | Reinhardt |
| 5,039,778 A | 8/1991 | Dang et al. |
| 2006/0018870 A1* | 1/2006 | Kuriyama et al. ......... 424/78.01 |

FOREIGN PATENT DOCUMENTS

| JP | 8-809516 A | 10/1996 |
| JP | 2001-75280 A | 3/2001 |
| JP | 2005350585 | * 12/2005 |
| WO | 85/04178 A1 | 9/1985 |
| WO | 94/25506 A1 | 11/1994 |

OTHER PUBLICATIONS

Loon-Seng Tan et al.; Pseudo-ladder rigid-rod polymers: dihydroxy pendent benzothiazole aromatic heterocyclic polymer and copolymers; Polymer; vol. 35; No. 14; 1994; pp. 3091-3101.

* cited by examiner

*Primary Examiner*—Terressa M Boykin
(74) *Attorney, Agent, or Firm*—Sughrue Mion, PLLC

(57) ABSTRACT

There are provided a rigid heterocyclic polymer comprising rigid recurring units such as units represented by the following formulae (a) and (b):

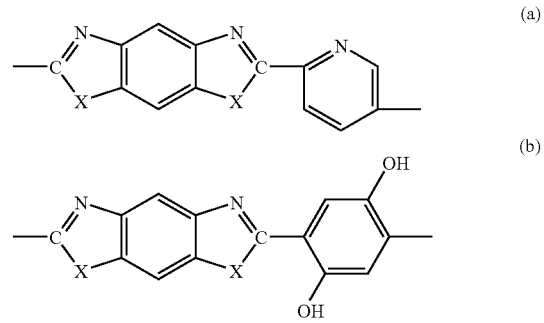

wherein X is O, S or NH,
a production process thereof, and fibers comprising the polymer.

21 Claims, No Drawings

RIGID HETEROCYCLIC POLYMER, PRODUCTION PROCESS THEREOF, AND FIBERS COMPRISING THE POLYMER

TECHNICAL FIELD

The present invention relates to a rigid heterocyclic polymer, a production process thereof, and fibers comprising the polymer.

BACKGROUND ART

A wide variety of examples have been introduced about polybenzobisoxazole-based compounds (refer to WO85/04178 pamphlet). Although this pamphlet describes benzobisoxazole and production of pyridine-benzobisoxazole copolymer, it does not disclose molded articles such as fibers.

U.S. Pat. No. 4,051,108 describes a process for producing a film from a para-oriented aromatic heterocyclic polymer such as polybenzoazole. Further, U.S. Pat. No. 4,225,700 describes a polybenzobisthiazole polymer. An azole-based polymer having a hydroxyl group and a production process thereof are reported in U.S. Pat. No. 5,039,778 and Polymer, 35, (1994) 3091. However, this report does not disclose molding, physical properties and the like of fibers and the like of composition or copolymer which comprises benzobisoxazole and an azole polymer containing a phenylene group in a nitrogen group such as a pyridine-benzobisoxazole copolymer.

DISCLOSURE OF THE INVENTION

An object of the present invention is to provide a rigid heterocyclic polymer having an intermolecular hydrogen bond of a rigid heterocyclic polymer and having excellent tensile strength and compressive strength.

Another object of the present invention is to provide a rigid heterocyclic polymer having high stainability with cationic dye and acid dye and fibers comprising the polymer.

Still another object of the present invention is to provide a process for producing the above polymer of the present invention.

Other objects and advantages of the present invention will become apparent from the following description.

According to the present invention, firstly, the above objects and advantages of the present invention are achieved by a polymer which comprises at least one first recurring unit selected from the group consisting of recurring units represented by each of the following formulae (A) and (B):

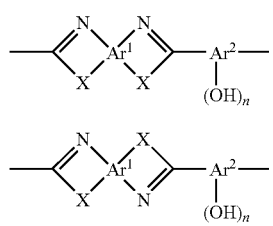

wherein n is an integer of 1 to 4, X is O, S or NH, $Ar^1$ is a tetravalent aromatic group having 4 to 20 carbon atoms, and $Ar^2$ is an (n+2)-valent aromatic group having 4 to 20 carbon atoms, and at least one second recurring unit selected from the group consisting of recurring units represented by each of the following formulae (C) and (D):

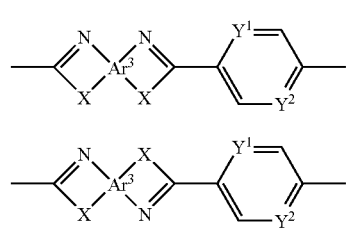

wherein X is O, S or NH, $Ar^3$ is a tetravalent aromatic group having 4 to 20 carbon atoms, and $Y^1$ and $Y^2$ are N or CH with the proviso that at least one of $Y^1$ and $Y^2$ is N, which satisfies the following expression (1):

$$0.1 \leq (a+b)/(c+d) \leq 10 \qquad (1)$$

wherein a, b, c and d represent the numbers of moles of the recurring units represented by the formulae (A), (B), (C) and (D), respectively, and which shows a reduced viscosity at 25° C. of 0.05 to 200 dl/g as a solution prepared by dissolving the polymer in methanesulfonic acid at a concentration of 0.5 g/100 ml.

According to the present invention, secondly, the above objects and advantages of the present invention are achieved by a process for producing the above polymer by polycondensing at least one first raw material selected from the group consisting of aromatic amines represented by each of the following formulae (G) and (H):

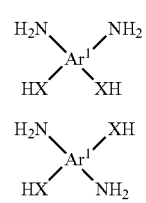

wherein X and $Ar^1$ are the same as defined in the formulae (A) and (B), and strong acid salts thereof, at least one second raw material selected from the group consisting of first aromatic dicarboxylic acids represented by the following formula (I):

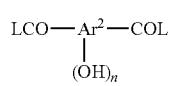

wherein $Ar^2$ and n are the same as defined in the formula (A), and L is OH, a halogen atom or a group represented by OR wherein R is a monovalent aromatic group having 6 to 20 carbon atoms, and
at least one third raw material selected from the group consisting of second aromatic dicarboxylic acids represented by the following formula (J):

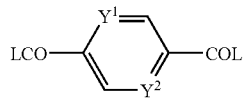
(J)

wherein L is the same as defined in the formula (I), and $Y^1$ and $Y^2$ are the same as defined in the formulae (C) and (D), in amounts that satisfy the following expressions (2) and (3):

$$0.8 \leq (g+h)/(i+j) \leq 1.2 \quad (2)$$

$$0.1 \leq i/j \leq 10 \quad (3)$$

wherein g, h, i, and j represent the numbers of moles of the first, second and third raw materials represented by the formulae (G), (H), (I) and (J) respectively, to form the above polymer of the present invention.

According to the present invention, thirdly, the above objects and advantages of the present invention are achieved by a solution which comprises the above polymer of the present invention and methanesulfonic acid or polyphosphoric acid as a solvent and having the above polymer dissolved in the above solvent, e.g. a solution used as a spinning dope.

According to the present invention, fourthly, the above objects and advantages of the present invention are achieved by fibers comprising the polymer of the present invention.

PREFERABLE EMBODIMENT OF THE INVENTION

The polymer of the present invention comprises at least one first recurring unit selected from the group consisting of recurring units represented by the above formulae (A) and (B) and at least one second recurring unit selected from the group consisting of recurring units represented by the above formulae (C) and (D).

In the formulae (A) and (B), $Ar^1$ is an aromatic group having 4 to 20 carbon atoms. $Ar^1$ may contain one or two nitrogen atoms as cyclic member.

Preferred examples of $Ar^1$ include

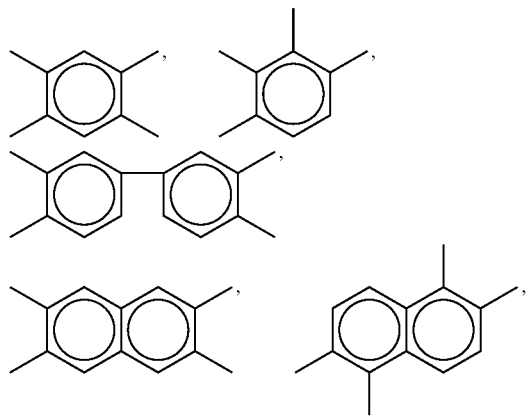

-continued

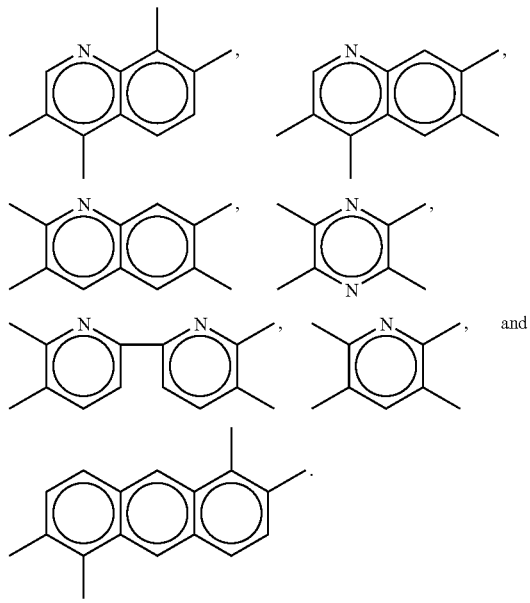

$Ar^2$ is an (n+2)-valent aromatic group having 4 to 20 carbon atoms.

Preferred examples of a group represented by

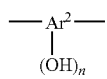

include

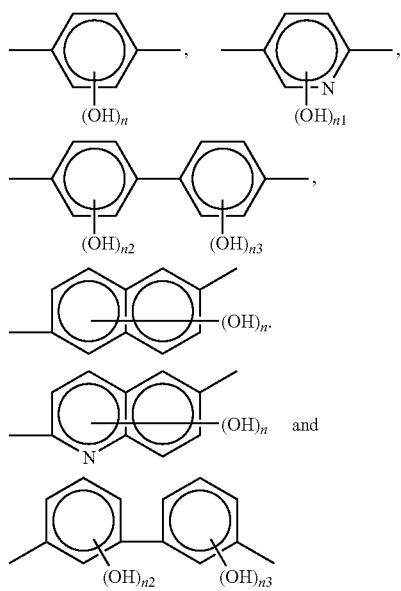

wherein n is an integer of 1 to 4, $n_1$ is an integer of 1 to 3, and $n_2$ and $n_3$ are an integer of 0 to 4 with the proviso that $n_2+n_3$ is 1 to 4.

X is O, S or NH. Of these, O or S is preferred n is an integer of 1 to 4.

The above first recurring units are preferably ones represented by the following formula (A-1):

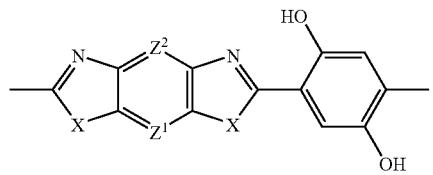
(A-1)

wherein X is the same as defined in the formula (A), and $Z^1$ and $Z^2$ are each independently N or CH, and the following formula (B-1):

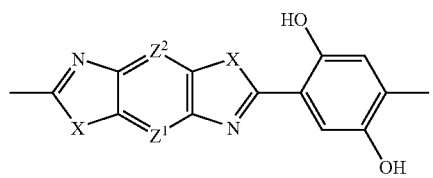
(B-1)

wherein X is the same as defined in the formula (B), and $Z^1$ and $Z^2$ are each independently N or CH.

Further, in the formulae (C) and (D), $Ar^3$ is a tetravalent aromatic group having 4 to 20 carbon atoms. Preferred groups as $Ar^3$ are the same as those mentioned above for $Ar^1$.

X is O, S or NH. Of these, O or S is preferred. $Y^1$ and $Y^2$ are N or CH. One of $Y^1$ and $Y^2$ is N.

Therefore, a group represented by

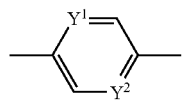

is any of

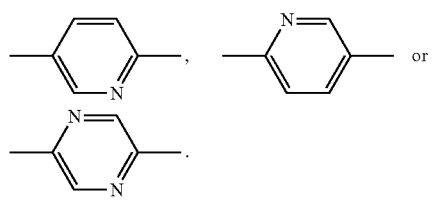

The above second recurring units are preferably ones represented by the following formula (C-1):

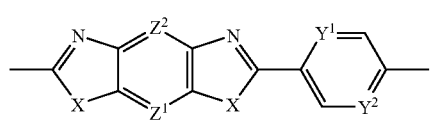
(C-1)

wherein X, $Y^1$ and $Y^2$ are the same as defined in the formula (C), and $Z^1$ and $Z^2$ are the same as defined in the formula (A-1), and the following formula (D-1):

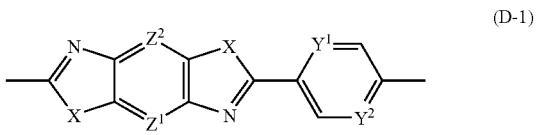
(D-1)

wherein X, $Y^1$ and $Y^2$ are the same as defined in the formula (D), and $Z^1$ and $Z^2$ are the same as defined in the formula (B-1).

The polymer of the present invention particularly preferably comprises a combination of the first recurring unit represented by the formula (A-1) and the second recurring unit represented by the formula (C-1) or a combination of the first recurring unit represented by the formula (B-1) and the second recurring unit represented by the formula (D-1).

Further, the polymer of the present invention comprises the first recurring unit and the second recurring unit in amounts that satisfy the following expression (1):

$$0.1 \leq (a+b)/(c+d) \leq 10 \qquad (1)$$

wherein a, b, c and d represent the numbers of moles of the recurring units represented by the formulae (A), (B), (C) and (D), respectively.

The amounts of the first and second recurring units are preferably represented by the following expression (1-1):

$$0.1 \leq (a+b)/(c+d) \leq 1 \qquad (1\text{-}1)$$

wherein a, b, c and d are the same as defined in the formula (1).

The polymer of the present invention shows a reduced viscosity at 25° C. of 0.05 to 200 dl/g, preferably 1.0 to 100 dl/g, more preferably 10 to 80 dl/g, as a solution prepared by dissolving the polymer in methanesulfonic acid at a concentration of 0.5 g/100 ml.

The polymer of the present invention may further comprise at least one third recurring unit selected from the group consisting of recurring units represented by the following formulae (E) and (F):

(E)

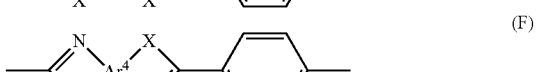
(F)

wherein $Ar^4$ is a tetravalent aromatic group having 4 to 20 carbon atoms, as required.

$Ar^4$ is a tetravalent aromatic group having 4 to 20 carbon atoms. Specific examples of $Ar^4$ include the specific groups mentioned above for $Ar^1$.

The third recurring unit is used in an amount of preferably not larger than 30 mol %, more preferably not larger than 10 mol %, based on the total of the first, second and third recurring units.

The polymer of the present invention is produced by polycondensing at least one first raw material selected from the group consisting of aromatic amines represented by the formulae (G) and (H) and strong acid salts thereof, at least one second raw material selected from the group consisting of first aromatic dicarboxylic acids represented by the formula (I) and at least one third raw material selected from the group consisting of second aromatic dicarboxylic acids represented by the formula (J).

In the formulae (G) and (H), X and $Ar_1$ are the same as defined in the formulae (A) and (B).

The first raw material is preferably at least one selected from the group consisting of compounds represented by the following formula (G-1);

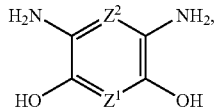
(G-1)

wherein $Z^1$ and $Z^2$ are the same as defined in the formula (A-1), and the following formula (G-2):

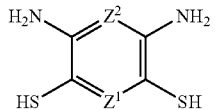
(G-2)

wherein $Z^1$ and $Z^2$ are the same as defined in the formula (A-1)

and strong acid salts of these compounds or at least one selected from the group consisting of compounds represented by the following formula (H-1):

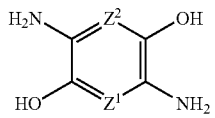
(H-1)

wherein $Z^1$ and $Z^2$ are the same as defined in the formula (A-1).

and the following formula (H-2):

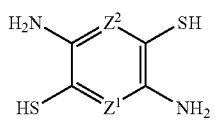
(H-2)

wherein $Z^1$ and $Z^2$ are the same as defined in the formula (A-1), and strong acid salts of these compounds.

In the above formula (I), $Ar^2$ and n are the same as defined in the formula (A).

L is OH, a halogen atom or OR (wherein R is a monovalent aromatic group having 6 to 20 carbon atoms) Illustrative examples of the halogen atom include a chlorine atom and a bromine atom. Illustrative examples of the monovalent aromatic group having 6 to 20 carbon atoms include phenyl, naphthyl, biphenyl, 4-(2-phenylpropyl)phenyl, phenoxyphenyl, phenylthiophenyl, phenylsulfonylphenyl and benzoylphenyl groups.

Further, one or more hydrogen atoms of these aromatic groups may be each independently substituted with a halogen group such as fluorine, chlorine or bromine, an alkyl group having 1 to 6 carbon atoms such as a methyl, ethyl, propyl or hexyl group, a cycloalkyl group having 5 to 10 carbon atoms such as a cyclopentyl or cyclohexyl group, and an alkoxycarbonyl group such as a methoxycarbonyl or ethoxycarbonyl group.

Further, in the above formula (J), L is the same as defined in the above formula (I), and $Y^1$ and $Y^2$ are the same as defined in the above formulae (C) and (D).

Illustrative examples of strong acids of the strong acid salts include inorganic acids such as hydrochloric acid, sulfuric acid and phosphoric acid, and organic acids such as methanesulfonic acid and p-toluenesulfonic acid.

The second raw material is preferably a first benzenedicarboxylic acid represented by the following formula (I-1):

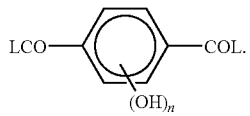
(I-1)

wherein L and n are the same as defined in the formula (I), and the third raw material is preferably a second aromatic dicarboxylic acid represented by the following formula (J-1):

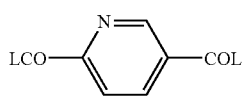
(J-1)

wherein L is the same as defined in the formula (J).

These first, second and third raw materials are used in amounts that satisfy the following expressions (2) and (3):

$$0.8 \leq (g+h)/(i+j) \leq 1.2 \quad (2)$$

$$0.1 \leq i/j \leq 10 \quad (3)$$

wherein g, h, i, and j represent the numbers of moles of the first, second and third raw materials represented by the formulae (G), (H), (I) and (J). The relationship of the above expression (3) preferably satisfies the following expression (3-1):

$$0.1 \leq i/j \leq 1 \quad (3-1)$$

wherein i and j are the same as defined in the formula (3).

The first, second and third raw materials may be mixed together in the above amounts and subjected to a condensation reaction. Alternatively, a salt of the first and second raw materials or a salt of the first and third raw materials is formed in advance and used in a condensation reaction.

The reaction may be a solution reaction which is carried out in a solvent or a thermofusion reaction using no solvent. In particular, the reaction is preferably carried out in a reaction solvent under agitation and heating. The reaction temperature is preferably 50 to 500° C., more preferably 70 to 350° C. When the temperature is lower than 50° C., the reaction proceeds slowly, while when the temperature is higher than 500° C., a side reaction such as decomposition is liable to occur. The reaction time varies according to temperature conditions but is generally 1 hour to several tens of hours. The reaction can be carried out under increased to reduced pressure.

Although the reaction can proceed without a catalyst, a transesterification catalyst may be used as required. Illustrative examples of the transesterification catalyst include antimony compounds such as antimony trioxide, tin compounds such as stannous acetate, tin chloride (II), tin octylate, dibutyltin oxide and dibutyltin diacetate, alkaline earth metal salts such as calcium acetate, alkali metal salts such as sodium carbonate and potassium carbonate, and phosphorous acids such as diphenyl phosphite and triphenyl phosphite.

Illustrative examples of preferred solvents used in the reaction include 1-methyl-2-pyrrolidone, 1-cyclohexyl-2-pyrrolidone, dimethylacetamide, dimethyl sulfoxide, diphenyl ether, diphenyl sulfone, dichloromethane, chloroform, tetrahydrofuran, o-cresol, m-cresol, p-cresol, phosphoric acid, and polyphosphoric acid.

The reaction is desirably carried out in a dried inert gas atmosphere so as to prevent decomposition and coloration of the polymer to be obtained.

To the polymer of the present invention, various subsidiary additives may be added as required to make various modifications on the polymer. Illustrative examples of the subsidiary additives include stabilizers, antioxidants, ultraviolet absorbers, pigments, colorants, various fillers, antistatic agents, mold releasing agents, plasticizers, fragrances, antibacterial and antifungal agents, nucleation agents, lubricants, flame retardants, foaming agents, fillers, and similar additives.

The polymer of the present invention shows very high rigidity. Such a property is indicated as follows. That is, for example, the relationship between the Young's modulus E (GPa) determined by a tensile test and $<\sin^2\phi>_E$ determined by X-ray diffraction measurement of molded fibers is represented by the following expression (4):

$$\frac{1}{E} = \frac{1}{e_c} + \frac{<\sin^2\phi>_E}{2g} \quad (4)$$

wherein $$<\sin^2\phi>_E = \frac{\int_0^{\pi/2} I(\phi)\sin\phi\cos\phi\sin^2\phi\, d\phi}{\int_0^{\pi/2} I(\phi)\sin\phi\cos\phi\, d\phi}$$

E represents the Young's modulus of the fibers, $e_c$ represents a crystalline elastic modulus, I represents diffraction intensity in diffraction measurement, $\phi$ represents an angle of orientation in X-ray diffraction measurement, and g represents a shear modulus, and the shear modulus g calculated from the gradient ½ g of the linear relationship between 1/E and $<\sin^2\phi>_E$ is higher than 4 GPa and lower than 20 GPa.

To produce fibers from the polymer of the present invention, spinning known per se such as wet spinning or dry jet spinning is conducted on a solution obtained by dissolving the polymer of the present invention. As the above solution, i.e. spinning dope, a solution obtained by dissolving the polymer of the present invention in a solvent or carrying out polycondensation while the materials are dissolved as described above can also be used as it is.

The spinning dope is preferably dope obtained by dissolving the polymer of the present invention in a solvent which is methanesulfonic acid or polyphosphoric acid. The solvent is preferably polyphosphoric acid, especially polyphosphoric acid having a $P_2O_5$ content of 80 to 84 wt %. The concentration of the polymer in the solution is preferably 5 to 25 wt %, more preferably 10 to 20 wt %. The solution which forms the spinning dope is preferably a lyotropic liquid crystalline material.

In the step of spinning the fibers in the present invention, a high draft ratio or stretch ratio is preferably employed. For examples, a fiber extruded from a spinneret is preferably wound up at a draft ratio or stretch ratio of at least 10 times, preferably at least 50 times, more preferably at least 80 times.

According to the present invention, there are provided the thus produced fibers comprising the polymer of the present invention, e.g. fibers having a single yarn fineness of not higher than 1.1 decitex.

EXAMPLES

Hereinafter, the present invention will be further described by use of Examples and Comparative Examples. The present invention shall not be limited by them in any way. Measured values in the following Examples were determined in accordance with the following methods.

(1) Reduced Viscosity: This is a value measured in a methanesulfonic acid solution having a concentration of 0.5 g/100 ml at 25° C.

(2) Mechanical Property: Tensile strength was measured by TENSILON universal tester 1225A of ORIENTEC CO., LTD.

Reference Example 1

7 parts by weight of 4,6-diamino-1,3-benzenediol dihydrochloride was dissolved in 33 parts by weight of water deaerated with nitrogen. 5.347 parts by weight of pyridinedicarboxylic acid was dissolved in 64 parts by weight of 1M sodium hydroxide solution and deaerated with nitrogen. The 4,6-diamino-1,3-benzenediol dihydrochloride solution was added dropwise to the disodium pyridinedicarboxylate solution over 10 minutes to form a white precipitate of 4,6-diamino-1,3-benzenediol/pyridinedicarboxylate. In this case, the reaction temperature was kept at 90° C. The obtained salt was filtered, dispersed and mixed into 3,000 parts by weight of water deaerated with nitrogen, and then filtered again. This dispersion, mixing and filtration operation was repeated three times.

Reference Example 2

7 parts by weight of 4,6-diamino-1,3-benzenediol dihydrochloride was dissolved in 33 parts by weight of water deaerated with nitrogen. 6.180 parts by weight of 2,5-dihydroxyterephthalic acid was dissolved in 64 parts by weight of 1M sodium hydroxide solution and deaerated with nitrogen. The 4,6-diamino-1,3-benzenediol dihydrochloride solution was added dropwise to the disodium 2,5-dihydroxyterephthalate solution over 10 minutes to form a white precipitate of 4,6-diamino-1,3-benzenediol/2,5-dihydroxyterephthalate. In this case, the reaction temperature was kept at 90° C. The obtained salt was filtered, dispersed and mixed into 3,000 parts by weight of water deaerated with nitrogen, and then filtered again. This dispersion, mixing and filtration operation was repeated three times.

Reference Example 3

7 parts by weight of 4,6-diamino-1,3-benzenediol dihydrochloride was dissolved in 33 parts by weight of water deaerated with nitrogen. 5.3 parts by weight of terephthalic acid was dissolved in 64 parts by weight of 1M sodium hydroxide solution and deaerated with nitrogen. The 4,6-diamino-1,3-benzenediol dihydrochloride solution was added dropwise to the disodium terephthalate solution over 10 minutes to form a white precipitate of 4,6-diamino-1,3-benzenediol/terephthalate. In this case, the reaction temperature was kept at 90° C. The obtained salt was filtered, dispersed and mixed into 3,000 parts by weight of water deaerated with nitrogen, and then filtered again. This dispersion, mixing and filtration operation was repeated three times.

Example 1

8.726 parts by weight of 4,6-diamino-1,3-benzenediol/pyridinedicarboxylate obtained in Reference Example 1, 4.803 parts by weight of 2,5-dihydroxyterephthalate of 4,6-diamino-1,3-benzenediol obtained in Reference Example 2, 43.3 parts by weight of polyphosphoric acid, 15.0 parts by weight of phosphorus pentoxide and 0.1 parts by weight of tin chloride (II) were agitated and mixed together at 80° C. for 1 hour. Then, the mixture was heated to 150° C. over 2 hours and then agitated at 150° C. for 6 hours. Thereafter, the mixture was heated to 200° C. over 1 hour and allowed to react at 200° C. for 20 hours. The reduced viscosity of the obtained polymer was 50 dl/g.

[Spinning 1]

The polymer dope obtained by the above method was extruded into a coagulation bath having ion exchange water at a dope temperature of 180° C. and 2.0 g/min by use of a cap which had a pore having a diameter of 0.2 mm. The distance between the surface of the cap and the coagulation bath was 20 cm. The extruded fiber was wound up in a rinsing bath at 38.5 m/min to obtain a filament. The physical properties of the obtained filament are shown in Table 1.

[Spinning 2]

The same procedure as that in Spinning 1 was carried out except that the extruded fiber was wound up at 75 m/min. The physical properties of the obtained filament are shown in Table 1.

[Spinning 3]

The same procedure as that in Spinning 1 was carried out except that the extruded fiber was wound up at 140 m/min. The physical properties of the obtained filament are shown in Table 1.

[Calculation of Shear Modulus g]

$<\sin^2\phi>_E$ of Stretch 1 to 3 was plotted at three points, and g was determined from the value of Young's modulus E and the term ½ g of the following expression (4):

$$\frac{1}{E} = \frac{1}{e_c} + \frac{<\sin^2\phi>_E}{2g} \qquad (4)$$

$$<\sin^2\phi>_E = \frac{\int_0^{\pi/2} I(\phi)\sin\phi\cos\phi\sin^2\phi\, d\phi}{\int_0^{\pi/2} I(\phi)\sin\phi\cos\phi\, d\phi}$$

(wherein E represents the Young's modulus of fibers, $e_c$ represents a crystalline elastic modulus, I represents diffraction intensity in X-ray diffraction measurement, $\phi$ represents an angle of orientation in X-ray diffraction measurement, and g represents a shear modulus.)

As a result, the shear modulus g was calculated as 4.2 GPa. That is, the shear modulus of the fibers obtained from the heterocyclic polymer of Example 1 was 4.2 GPa.

[Spinning 4]

The polymer dope was extruded into a coagulation bath having ion exchange water at a dope temperature of 180° C. and 0.8 g/min by use of a cap having a pore having a diameter of 0.1 mm. The distance between the surface of the cap and the coagulation bath was 20 cm. The extruded fiber was wound up in a rinsing bath at 50 m/min to obtain a filament. The physical properties of the obtained filament are shown in Table 1.

[Heat Treatment 1]

The fiber obtained in Spinning 1 was heat-treated in a nitrogen atmosphere at 450° C. for 6 minutes under a tension of 0.5 g/de. The physical properties of the obtained filament are shown in Table 1.

Example 2

6.545 parts by weight of pyridinedicarboxylate of 4,6-diamino-1,3-benzenediol obtained in Reference Example 1, 7.205 parts by weight of 2,5-dihydroxyterephthalate of 4,6-diamino-1,3-benzenediol obtained in Reference Example 2, 43.3 parts by weight of polyphosphoric acid, 15.0 parts by weight of phosphorus pentoxide and 0.1 parts by weight of tin chloride (II) were agitated and mixed together at 80° C. for 1 hour. Then, the mixture was heated to 150° C. over 2 hours and then agitated at 150° C. for 6 hours. Thereafter, the mixture was heated to 200° C. over 1 hour and allowed to react at 200° C. for 20 hours. The reduced viscosity of the obtained polymer was 47 dl/g.

[Spinning]

The polymer dope obtained by the above method was extruded into a coagulation bath having ion exchange water at a dope temperature of 180° C. and 2.0 g/min by use of a cap which had a pore having a diameter of 0.2 mm. The distance between the surface of the cap and the coagulation bath was 20 cm. The extruded fiber was wound up in a rinsing bath at 90 m/min to obtain a filament. The physical properties of the obtained filament are shown in Table 1.

Example 3

4.363 parts by weight of pyridinedicarboxylate of 4,6-diamino-1,3-benzenediol obtained in Reference Example 1, 9.607 parts by weight of 2,5-dihydroxyterephthalate of 4,6-diamino-1,3-benzenediol obtained in Reference Example 2, 43.3 parts by weight of polyphosphoric acid, 15.0 parts by weight of phosphorus pentoxide and 0.1 parts by weight of tin chloride (II) were agitated and mixed together at 80° C. for 1 hour. Then, the mixture was heated to 150° C. over 2 hours and then agitated at 150° C. for 6 hours. Thereafter, the mixture was heated to 200° C. over 1 hour and allowed to react at 200° C. for 20 hours. The reduced viscosity of the obtained polymer was 43 dl/g.

[Spinning]

The polymer dope obtained by the above method was extruded into a coagulation bath having ion exchange water at a dope temperature of 180° C. and 2.0 g/min by use of a cap which had a pore having a diameter of 0.2 mm. The distance between the surface of the cap and the coagulation bath was 20 cm. The extruded fiber was wound up in a rinsing bath at 130 m/min to obtain a filament. The physical properties of the obtained filament are shown in Table 1.

Comparative Example 1

13.1 parts by weight of pyridinedicarboxylate of 4,6-diamino-1,3-benzenediol obtained in Reference Example 1, 43.3 parts by weight of polyphosphoric acid, 15.0 parts by weight of phosphorus pentoxide and 0.1 parts by weight of tin chloride (II) were agitated and mixed together at 80° C. for 1 hour. Then, the mixture was heated to 150° C. over 2 hours and then agitated at 150° C. for 6 hours. Thereafter, the mixture was heated to 200° C. over 1 hour and allowed to react at 200° C. for 20 hours. As a result of observing the obtained polyphosphoric acid solution polymer dope by a polarization microscope, it showed liquid crystallinity. The reduced viscosity of polymer obtained by reprecipitating the above liquid crystal dope in water was 36 dl/g.

[Spinning]

The same procedure as that in Spinning 1 was carried out except that the polymer dope obtained by the above method was used and that the extruded fiber was wound up at 190 m/min in a rinsing bath having ion exchange water. The physical properties of the obtained filament are shown in Table 1.

Comparative Example 2

13.1 parts by weight of 2,5-dihydroxyterephthalate of 4,6-diamino-1,3-benzenediol obtained in Reference Example 2, 43.3 parts by weight of polyphosphoric acid, 15.0 parts by weight of phosphorus pentoxide and 0.1 parts by weight of tin chloride (II) were agitated and mixed together at 80° C. for 1 hour. Then, the mixture was heated to 150° C. over 2 hours and then agitated at 150° C. for 6 hours. The reduced viscosity of the obtained polymer was 15 dl/g.

[Spinning]

The same procedure as that in Spinning 1 was carried out except that the polymer dope obtained by the above method was used and that the extruded fiber was wound up at 50 m/min in a rinsing bath having ion exchange water. The physical properties of the obtained filament are shown in Table 1.

Comparative Example 3

13.1 parts by weight of terephthalate of 4,6-diamino-1,3-benzenediol obtained in Reference Example 3, 43.3 parts by weight of polyphosphoric acid, 15.0 parts by weight of phosphorus pentoxide and 0.1 parts by weight of tin chloride (II) were agitated and mixed together at 80° C. for 1 hour. Then, the mixture was heated to 150° C. over 2 hours and then agitated at 150° C. for 6 hours. Thereafter, the mixture was heated to 200° C. over 1 hour and allowed to react at 200° C. for 1 hour. As a result of observing the obtained polyphosphoric acid solution polymer dope by a polarization microscope, it showed liquid crystallinity. The reduced viscosity of polymer obtained by reprecipitating the above liquid crystal dope in water was 35 dl/g.

[Spinning]

The same procedure as that in Spinning 1 was carried out except that the polymer dope obtained by the above method was used and that the extruded fiber was wound up at 50 m/min in a rinsing bath having ion exchange water. The physical properties of the obtained filament are shown in Table 1.

TABLE 1

|  | Single Yarn Fineness (dtex) | Young's Modulus (GPa) | Tensile Strength (mN/tex) | Elongation (%) | $<\sin^2\phi>_E$ | Shear Modulus g (GPa) |
| --- | --- | --- | --- | --- | --- | --- |
| Example 1 Spinning 1 | 1.9 | 146 | 2408 | 3.3 | 0.043 | 4.2 |
| Example 1 Spinning 2 | 3.7 | 122 | 2192 | 4.2 | 0.046 |  |
| Example 1 Spinning 3 | 7.2 | 119 | 1498 | 2.3 | 0.041 |  |
| Example 1 Spinning 4 | 0.9 | 182 | 2669 | 3.1 | — | — |
| Example 1 Heat Treatment 1 | 1.3 | 233 | 1681 | 1.1 | — | — |
| Example 2 | 2.6 | 137 | 2253 | 3.4 | — | — |
| Example 3 | 1.6 | 144 | 1802 | 2.5 | — | — |
| Comparative Example 1 | 0.9 | 154 | 1538 | 2.3 | — | — |
| Comparative Example 2 | 32 | 63 | 953 | 6.4 | — | — |
| Comparative Example 3 | 6.8 | 83 | 854 | 2.3 | — | — |

Example 4

9 parts by weight of 4,6-diamino-1,3-benzenediol dihydrochloride, 2.789 parts by weight of 2,5-dihydroxyterephthalic acid, 4.706 parts by weight of 2,5-pyridinedicarboxylic acid, 15 parts by weight of $P_2O_5$ and 43.3 parts by weight of 84% polyphosphoric acid were agitated at 80° C. for 1 hour. Then, the mixture was heated to 100° C. in 3 hours and agitated under a flow of nitrogen with the pressure inside the system kept at 40 millibar.

Then, the mixture was heated to 130° C. and agitated at 130° C. for 3 hours, and heated to 180° C. and agitated at 180° C. for 20 hours. Then, after the pressure was recovered to normal pressure, the mixture was agitated at 200° C. for 24 hours.

The reduced viscosity of polymer obtained by reprecipitating the above liquid crystal dope in water was 15 dl/g.

Example 5

8.725 parts by weight of 4,6-diamino-1,3-benzenediol/pyridinedicarboxylate obtained in Reference Example 1, 4.803 parts by weight of 2,5-dihydroxyterephthalate of 4,6-diamino-1,3-benzenediol obtained in Reference Example 2, 0.391 parts by weight of terephthalate of 4,6-diamino-1,3-benzenediol obtained in Reference Example 3, 43.3 parts by weight of polyphosphoric acid, 15.0 parts by weight of phosphorus pentoxide and 0.1 parts by weight of tin chloride (II) were agitated and mixed together at 80° C. for 1 hour. Then, the mixture was heated to 150° C. over 2 hours and then agitated at 150° C. for 6 hours. Thereafter, the mixture was heated to 200° C. over 1 hour and allowed to react at 200° C. for 20 hours. The reduced viscosity of the obtained polymer was 38 dl/g.

Example 6

12.716 parts by weight of 4,6-diamino-1,3-benzenediol/pyridinedicarboxylate obtained in Reference Example 1, 7 parts by weight of 2,5-dihydroxyterephthalate of 4,6-diamino-1,3-benzenediol obtained in Reference Example 2, 42.5 parts by weight of polyphosphoric acid, 22.5 parts by weight of phosphorus pentoxide and 0.1 parts by weight of tin chloride (II) were agitated and mixed together at 80° C. for 1 hour. Then, the mixture was heated to 150° C. over 2 hours and then agitated at 150° C. for 6 hours. Thereafter, the mixture was heated to 200° C. over 1 hour and allowed to react at 200° C. for 20 hours. The reduced viscosity of the obtained polymer was 48 dl/g.

Example 7

4.65 parts by weight of 2,5-diamino-1,4-benzenedithiol dihydrochloride, 1.253 parts by weight of 2,5-dihydroxyterephthalic acid, 2.113 parts by weight of 2,5-pyridinedicarboxylic acid, 6.5 parts by weight of $P_2O_5$ and 31 parts by weight of 84% polyphosphoric acid were agitated at 80° C. for 1 hour. Then, the mixture was heated to 100° C. in 3 hours and agitated under a flow of nitrogen with the pressure inside the system kept at 40 millibar.

Then, the mixture was heated to 130° C. and agitated at 130° C. for 5 hours, and heated to 180° C. and agitated at 180° C. for 20 hours. Then, after the pressure was recovered to normal pressure, the mixture was agitated at 190° C. for 24 hours.

The reduced viscosity of polymer obtained by reprecipitating the above liquid crystal dope in water was 18 dl/g.

The invention claimed is:

1. A rigid heterocyclic polymer which comprises at least one first recurring unit selected from the group consisting of recurring units represented by each of the following formulae (A) and (B):

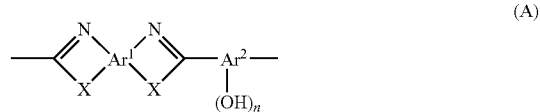

(A)

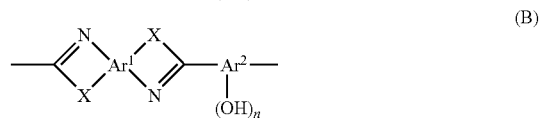

(B)

wherein n is an integer of 1 to 4, X is O, S or NH, $Ar^1$ is a tetravalent aromatic group having 4 to 20 carbon atoms, and $Ar^2$ is an (n+2)-valent aromatic group having 4 to 20 carbon atoms, and at least one second recurring unit selected from the group consisting of recurring units represented by each of the following formulae (C) and (D):

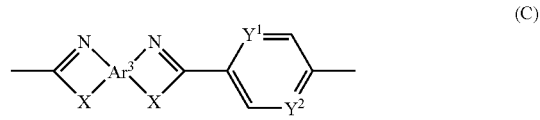

(C)

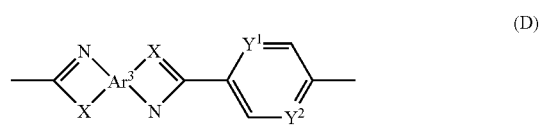

(D)

wherein X is O, S or NH, $Ar^3$ is a tetravalent aromatic group having 4 to 20 carbon atoms, and $Y^1$ and $Y^2$ are N or CH with the proviso that at least one of $Y^1$ and $Y^2$ is N, which satisfies the following expression (1):

$$0.1 \leq (a+b)/(c+d) \leq 10 \quad (1)$$

wherein a, b, c and d represent the numbers of moles of the recurring units represented by the formulae (A), (B), (C) and (D), respectively, and which polymer has a reduced viscosity at 25° C. of 0.05 to 200 dl/g measured as a solution which has been prepared by dissolving the polymer in methanesulfonic acid at a concentration of 0.5 g/100 ml.

2. The rigid heterocyclic polymer of claim 1, further comprising at least one third recurring unit selected from the group consisting of recurring units represented by each of the following formulae (E) and (F):

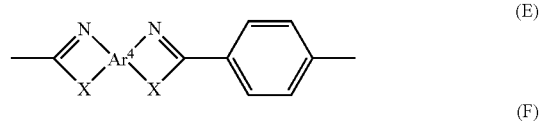

(E)

(F)

wherein Ar⁴ is a tetravalent aromatic group having 4 to 20 carbon atoms.

3. The rigid heterocyclic polymer of claim 1, wherein Ar¹ in the formulae (A) and (B) or Ar³ in the formulae (C) and (D) is

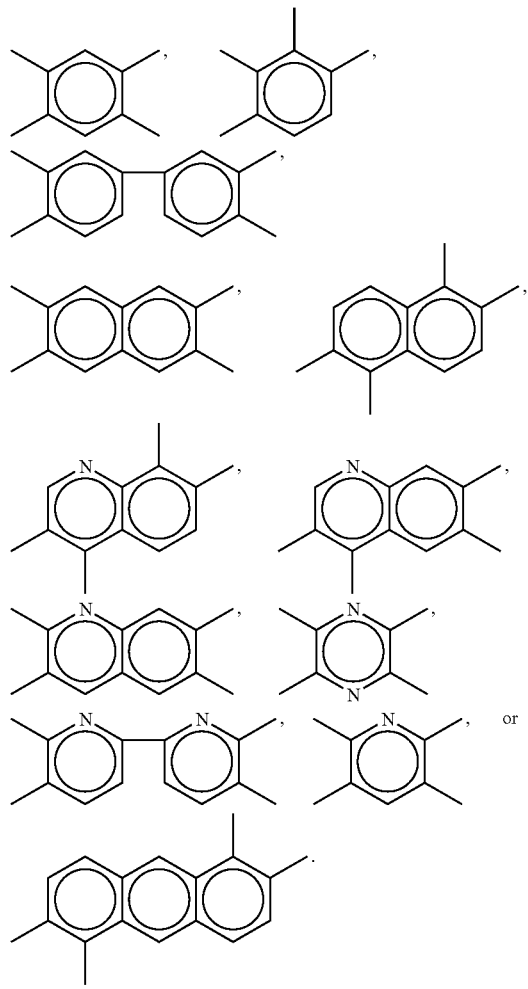

4. The rigid heterocyclic polymer of claim 1, wherein

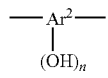

in the formulae (A) and (B) is

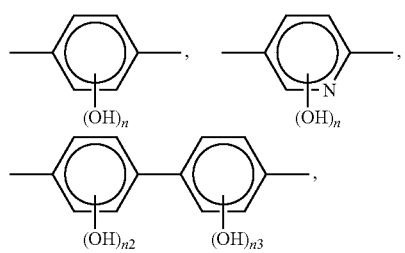

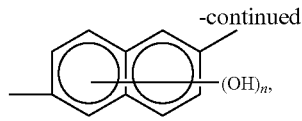

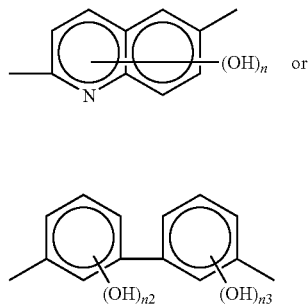

wherein n is an integer of 1 to 4, $n_1$ is an integer of 1 to 3, and $n_2$ and $n_3$ are an integer of 0 to 4 with the proviso that $n_2+n_3$ is 1 to 4.

5. The rigid heterocyclic polymer of claim 1, wherein the first recurring unit is represented by the following formula (A-1):

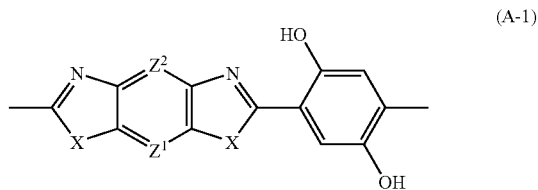

(A-1)

wherein X is the same as defined in the formula (A), and $Z^1$ and $Z^2$ are each independently N or CH, and the second recurring unit is represented by the following formula (C-1):

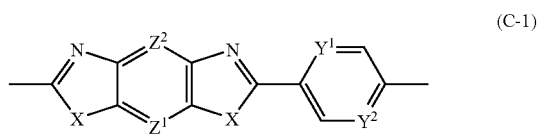

(C-1)

wherein X, $Y^1$ and $Y^2$ are the same as defined in the formula (C), and $Z^1$ and $Z^2$ are the same as defined in the formula (A-1).

6. The rigid heterocyclic polymer of claim 1, wherein the first recurring unit is represented by the following formula (B-1):

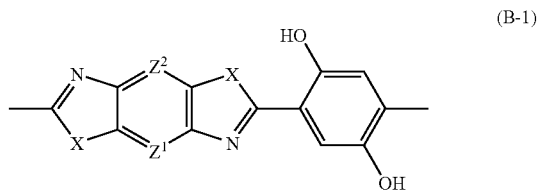

(B-1)

wherein X is the same as defined in the formula (B), and $Z^1$ and $Z^2$ are each independently N or CH, and the second recurring unit is represented by the following formula (D-1):

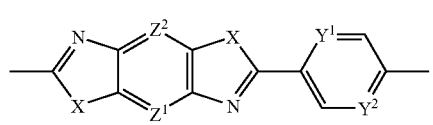
(D-1)

wherein X, $Y^1$ and $Y^2$ are the same as defined in the formula (D), and $Z^1$ and $Z^2$ are the same as defined in the formula (B-1).

7. The rigid heterocyclic polymer of claim 1, wherein the ratio of the first recurring units to the second recurring units is represented by the following expression (1-1):

$$0.1 \leq (a+b)/(c+d) \leq 1 \quad (1\text{-}1)$$

wherein a, b, c and d are the same as defined in the expression (1).

8. A process for producing a rigid heterocyclic polymer, which comprises polycondensing at least one first raw material selected from the group consisting of aromatic amines represented by each of the following formulae (G) and (H):

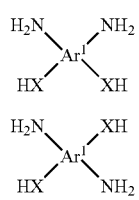
(G)

(H)

wherein X and $Ar^1$ are the same as defined in the formulae (A) and (B), and strong acid salts thereof,
at least one second raw material selected from the group consisting of first aromatic dicarboxylic acids represented by the following formula (I):

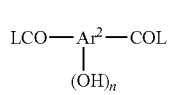
(I)

wherein $Ar^2$ and n are the same as defined in the formula (A), and L is OH, a halogen atom or a group represented by OR wherein R is a monovalent aromatic group having 6 to 20 carbon atoms, and
at least one third raw material selected from the group consisting of second aromatic dicarboxylic acids represented by the following formula (J):

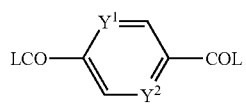
(J)

wherein L is the same as defined in the formula (I), and $Y^1$ and $Y^2$ are the same as defined in the formulae (C) and (D),
in amounts that satisfy the following expressions (2) and (3):

$$0.8 \leq (g+h)/(i+j) \leq 1.2 \quad (2)$$

$$0.1 \leq i/j \leq 10 \quad (3)$$

wherein g, h, i, and j represent the numbers of moles of the first, second and third raw materials represented by the formulae (G), (H), (I) and (J) respectively, at a temperature of 50 to 500° C. to form the rigid heterocyclic polymer of claim 1.

9. The process of claim 8, wherein the first raw material is at least one selected from the group consisting of a compound represented by the following formula (G-1):

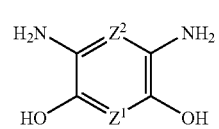
(G-1)

wherein $Z^1$ and $Z^2$ are the same as defined in the formula (A-1),
a compound represented by the following formula (G-2):

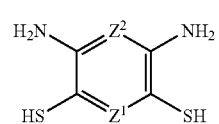
(G-2)

wherein $Z^1$ and $Z^2$ are the same as defined in the formula (A-1),
and strong acid salts of these compounds.

10. The process of claim 8, wherein the first raw material is at least one selected from the group consisting of a compound represented by the following formula (H-1):

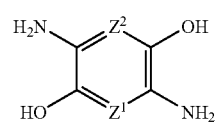
(H-1)

wherein $Z^1$ and $Z^2$ are the same as defined in the formula (A-1),
a compound represented by the following formula (H-2):

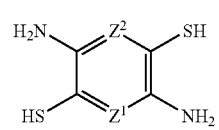
(H-2)

wherein $Z^1$ and $Z^2$ are the same as defined in the formula (A-1),
and strong acid salts of these compounds.

11. The process of claim 8, wherein the second raw material is a first benzenedicarboxylic acid represented by the following formula (I-1):

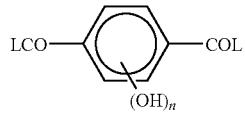
(I-1)

wherein L and n are the same as defined in the above formula (I),
and the third raw material is a second aromatic dicarboxylic acid represented by the following formula (J-1):

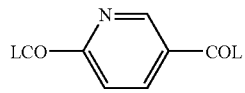
(J-1)

wherein L is the same as defined in the formula (J).

12. The process of claim 8, wherein the second raw material and the third raw material are used in amounts which satisfy the following expression (3-1):

$$0.1 \leq i/j \leq 1 \qquad (3\text{-}1)$$

wherein i and j are the same as defined in the formula (3).

13. The process of claim 8, wherein the first raw material, the second raw material and the third raw material are used as a preformed salt of the first and second raw materials and a preformed salt of the first and third raw materials.

14. A solution comprising the rigid heterocyclic polymer of claim 1 and methanesulfonic acid or polyphosphoric acid as a solvent and having the rigid heterocyclic polymer dissolved in the solvent.

15. The solution of claim 14, which is a lyotropic liquid crystalline material.

16. The solution of claim 14, wherein the solvent is polyphosphoric acid and the concentration of the rigid heterocyclic polymer is 5 to 25 wt %.

17. The solution of claim 14, wherein the content of $P_2O_5$ in the polyphosphoric acid solution is 80 to 84 wt %.

18. The solution of claim 14, which is a spinning dope.

19. The rigid heterocyclic polymer of claim 1, wherein the relationship between the Young's modulus E (GPa) determined by a tensile test and $<\sin^2\phi>_E$ determined by X-ray diffraction measurement of molded fibers is represented by the following expression (4):

$$\frac{1}{E} = \frac{1}{e_c} + \frac{<\sin^2\phi>_E}{2g} \qquad (4)$$

wherein $$<\sin^2\phi>_E = \frac{\int_0^{\pi/2} I(\phi)\sin\phi\cos\phi\sin^2\phi\,d\phi}{\int_0^{\pi/2} I(\phi)\sin\phi\cos\phi\,d\phi}$$

E represents the Young's modulus of the fibers, $e_c$ represents a crystalline elastic modulus, I represents diffraction intensity in diffraction measurement, $\phi$ represents an angle of orientation in X-ray diffraction measurement, and g represents a shear modulus,
and the shear modulus g calculated from the gradient ½ g of the linear relationship between 1/E and $<\sin^2\phi>_E$ is higher than 4 GPa and lower than 20 GPa.

20. Fibers comprising the rigid heterocyclic polymer of claim 1.

21. Fibers of claim 20, having a single yarn fineness of not higher than 1.1 decitex.

* * * * *